E. W. STULL.
MOTOR CONTROL SYSTEM.
APPLICATION FILED MAY 29, 1911.

1,050,497.

Patented Jan. 14, 1913.

UNITED STATES PATENT OFFICE.

EMMETT W. STULL, OF MILWAUKEE, WISCONSIN, ASSIGNOR TO ALLIS-CHALMERS COMPANY, A CORPORATION OF NEW JERSEY.

MOTOR-CONTROL SYSTEM.

1,050,497.  Specification of Letters Patent.  Patented Jan. 14, 1913.

Application filed May 29, 1911. Serial No. 630,150.

*To all whom it may concern:*

Be it known that I, EMMETT W. STULL, a citizen of the United States, residing at Milwaukee, in the county of Milwaukee and State of Wisconsin, have invented certain new and useful Improvements in Motor-Control Systems, of which the following is a full, clear, and exact specification.

My invention relates to motor control systems.

For reasons of economy, it has been found desirable to use higher voltages for the operation of interurban electric railways than are permissible for the ordinary city railways. The common voltage used in cities is about 600. By using double that voltage, or 1200 volts, for interurban service, a great saving in copper or in the number of substations may be effected. Since most interurban cars are also used more or less for city service, it becomes necessary in most cases to arrange the electrical apparatus on the cars which are used on such higher voltage interurban systems so that they may also be used on the lower voltage city systems.

It is the primary object of my invention to provide such an arrangement.

In order to obtain the same voltage per motor on the high and low voltage systems, a control system is used whereby motors which are connected in series for the high voltage interurban service are connected in parallel for the lower voltage city service. In the preferred form of my invention, the motors are arranged in groups, with two or more motors to a group; the ordinary control of the motors is effected by putting the groups in series and parallel relation while the proper connections for the high and low voltage parts of the line are obtained by putting the motors in each group in series and parallel relation.

Special safeguards are provided for preventing the use of a set of connections unsuitable for the supplied circuit. The changes between the connections for the high and low voltage line sections are obtained by a switch or switches which must be in proper position in order for the current to be supplied to the motors. In addition to an automatic switch, there are preferably two other switches which must be operated to obtain a change of connections, one power-operated and the other hand-operated. The hand-operated switch is required to be moved to proper position first, whereupon power may be supplied for the operation of the other switch provided the voltage corresponding to the position of the hand-operated switch is being supplied. In some cases the two switches may be combined in one.

The power-operated switch is preferably a combined series-parallel and reversing switch, and involves several novel features. It has two sets of positions, one for forward and one for backward movement. Each set of positions comprises a number of positions equal to the number of different voltages which may be supplied to the car; in the case shown, two. This makes four positions for this switch. The two end positions produce both different directions of motion and different connections; as do also the two intermediate positions. This feature is believed to be entirely new. By reason of it, there is the same distance between any two positions producing the same direction of motion, and there is also the same distance between any two positions producing the same set of connections. Thus an arrangement of magnets may be used for operating the switch whereby the energization of one magnet produces the proper operation of the switch to change either the connections or the direction of movement, regardless of what position the switch may be in.

There is also provided a novel arrangement of resistances. The resistance sections are divided into parts, the different parts being connected in series or in parallel according as the higher or lower voltage is supplied; thus the parts of the resistance sections are connected in series and parallel at the same time as the motors in a group.

The cars of electric railway systems practically universally have certain auxiliary apparatus requiring a supply of fairly constant voltage. In order to operate this auxiliary apparatus on both the higher and lower voltage sections of the line, there are provided suitable arrangements whereby practically the same voltage is always supplied to the auxiliary apparatus. Thus various lighting circuits are connected in series and parallel according as the higher or lower voltage is supplied; and other circuits, such as the air-compressor-motor circuit, the head-light circuit, and the control circuits, have resistances connected in them for the higher voltage supply, such resistances being short-circuited when the lower voltage is supplied. The connections for the auxiliary apparatus are preferably changed by the same switch which changes the connections of the parts of the resistance sections; this switch is the hand-operated switch already described.

There is also provided a cut-out arrangement for allowing certain of the motors to be cut out and others to operate substantially in their normal manner; in addition there are a number of safety features.

The various novel features of my invention will appear from the description and drawings, and will be particularly pointed out in the claims.

Figs. 2 to 11 inclusive are simple connection diagrams for various points of the master controller, Figs. 2 to 6 showing the connections with the car on a high voltage section of the line, Figs. 7 to 10 inclusive showing the connections similar to those of Figs. 2 to 5 but with one group of motors cut out and the car on a low voltage section of the line.

Figure 1:
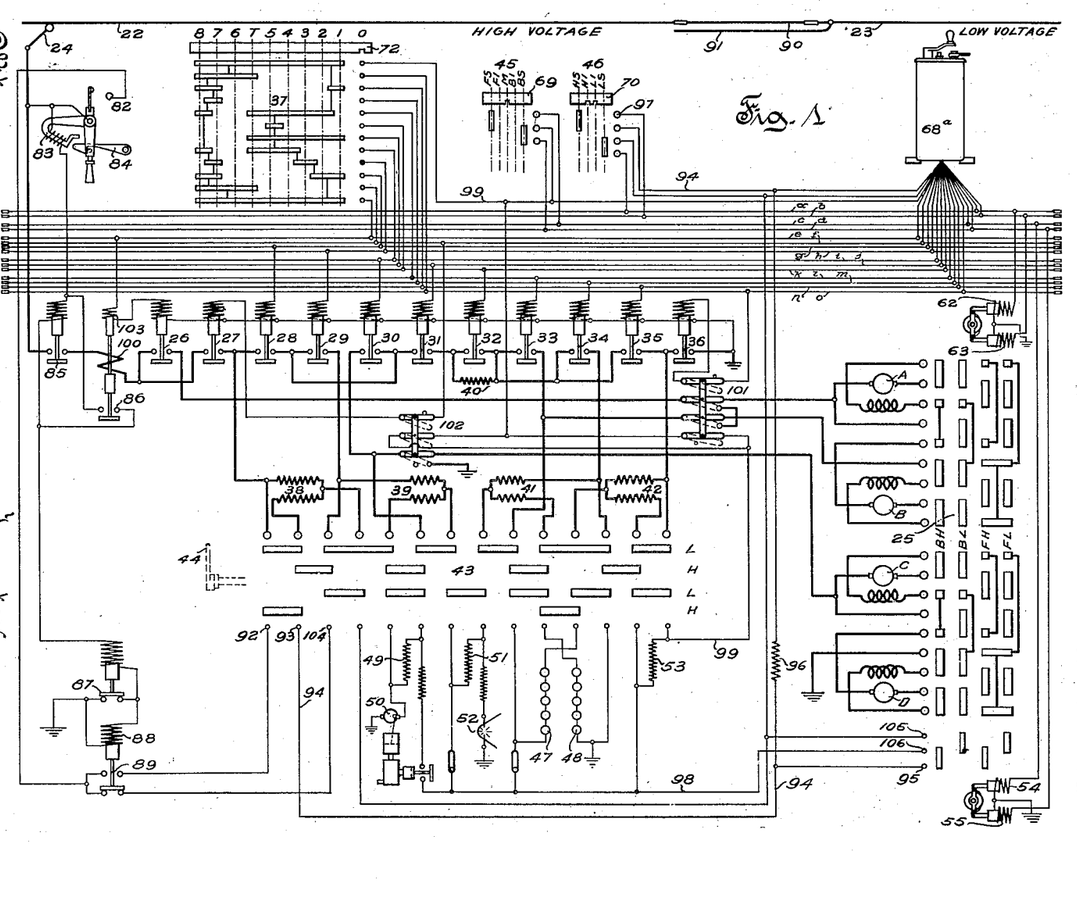
Figure 1 is a diagram showing the connections for one car in a system embodying my invention.

The trolley wire or third rail has high and low voltage sections 22 and 23 respectively. The current from either section may be supplied to the car through a trolley or collector 24. Each car may be operated separately, or there may be a number of cars controlled in common and operated together in a train. On each car there are four motors, A, B, C, and D, which are arranged in two groups, A and B, and C and D. The two motors forming a group are connected in series for high voltage and in parallel for low voltage. These connections are obtained by a combined series-parallel and reversing switch 25, which also reverses the relative direction of current through the field windings and armatures of such motors to obtain the desired direction of movement of the car; this switch will be considered in detail hereinafter. The speed of the motors is controlled by a group of solenoid-operated switches 26 to 36 inclusive. The operating solenoids for these switches are controlled, through suitable train wires $a, b, c \ldots o$, by the master controlling switch 37, and the switches are operated to control the groups of motors practically in accordance with the modified "bridge" control scheme shown in my co-pending application, Serial No. 575,024, filed Aug. 1, 1910, five resistance sections 38 to 42 inclusive being used. The resistance section 40 is for use in the bridge wire, and may sometimes be omitted. The other resistance sections are for use in the legs of the bridge, and are each divided into two parts. The resistance sections 40 may also be so divided, if desired. The parts of the different resistance sections may be connected in series and parallel by the drum switch 43, which is preferably operated by the same handle 44 which is used for operating the master reversing switch 45 and the master connection switch 46. The switch 43 in its high and low voltage positions respectively also puts two or more lighting circuits 47 and 48 in series and parallel, and cuts into and out of circuit resistance 49 in the circuit of the air compressor motor 50, resistance 51 in the circuit of the head-light 52, and resistance 53 in the control circuit. The lights and the air compressor may be otherwise controlled in any suitable or desired manner.

Figures 14, 15, 16, 17:
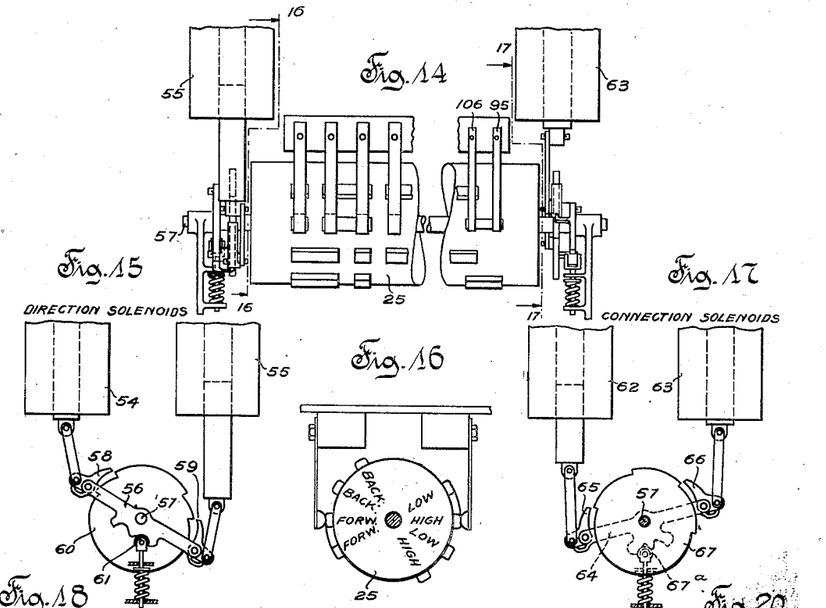
Fig. 14 is a side view of the combined series-parallel and reversing switch in the forward high voltage position.
Fig. 15 is an end view of the connection-changing mechanism of such switch, with the switch in the same position.
Figs. 16 and 17 are sections on the lines 16—16 and 17—17 of Fig. 14, Fig. 17 showing the reversing mechanism for the switch.

The combined series-parallel and reversing switch 25 is of the drum type and has four positions, forward high voltage (F H), forward low voltage (F L), backward high voltage (B H), and backward low voltage (B L), arranged in the order named. This order may be changed as desired, provided the two positions most remote from each other produce both different directions of movement and different interconnections of the motors. There is the same distance between the first and second positions named as between the third and fourth. The distance between the second and third positions may be the same as that between the other pairs of adjacent positions, or different; it is shown as the same. In either case the distance between the first and third positions is the same as that between the second and fourth. The contacts for the two groups of motors, A and B, C and D, are preferably arranged on opposite sides of the controller drum, as illustrated in Figs. 16 and 19, though they may all be arranged on the same side of the drum in a manner similar to that which for simplicity of diagram is shown in Fig. 1. The direction-controlling mechanism is shown at the left hand end of Fig. 14 and in Figs. 15 and 18, and the connection-controlling mechanism at the right hand end of Fig. 14 and in Figs. 17 and 20.

The direction control is obtained by two solenoids 54 and 55, which are energized by the master reversing switch 45 in the two operating or setting positions of the latter. These two solenoids when energized move a bar 56, loosely mounted on the shaft 57 of the drum 25, to the positions shown in Figs. 15 and 18 respectively. In such movement one or the other of the pawls 58 and 59 carried by said bar engages a notch in a disk 60, fast on the shaft 57, and moves the drum 25 through an angle equal to that between either forward position and the corresponding backward position; in other words, it moves the drum through an angular distance equal to twice that between two adjacent rows of contacts thereon. Each pawl 58 and 59 may coöperate with either one of two notches, the angular distance between such two notches being equal to that between two adjacent rows of contacts on the drum 25. The pawls 58 and 59 are so mounted that they are automatically disengaged from the notches of the disk 60 upon the deënergization of the solenoids 54 and 55 respectively. A spring-pressed pawl 61 maintains the bar 56 in either of its positions.

The connection control is obtained by two solenoids 62 and 63, which are energized by the master connection switch 46 in the two operating or setting positions of the latter. These two solenoids when energized respectively move a bar 64, loosely mounted on the shaft 57, to the position shown in Fig. 17 and a position an equal distance on the other side of the horizontal from that shown in such figure. In such movement one or the other of the pawls 65 and 66 carried by said bar engages a notch in a disk 67, fast on the shaft 57, and moves the drum 25 through an angle equal to that between either high voltage or series position and the corresponding low voltage or parallel position; in other words, it moves the drum through an angular distance equal to that between two adjacent rows of contacts thereon. Each pawl 65 and 66 may coöperate with either one of two notches, the angular distance between such two notches being equal to twice that between two adjacent rows of contacts on the drum 25. The pawls 65 and 66 are so mounted that they are automatically disengaged from the notches of the disk 67 upon the deënergization of the solenoids 62 and 63 respectively. A spring-pressed pawl 67ª maintains the bar 64 in either of its positions.

Figure 12:
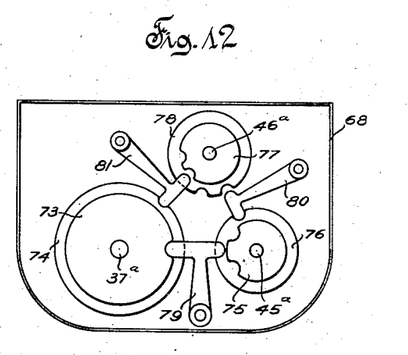
Fig. 12 shows the interlocking mechanism of the master controller.
Figure 13:
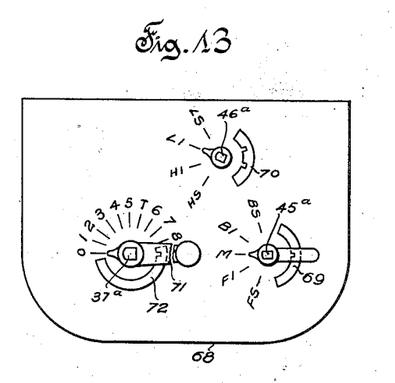
Fig. 13 is a plan view of the top of the master controller.

By this arrangement the direction solenoids may move the drum 25 from either the high or low voltage forward position to the corresponding backward position or vice versa, and the connection solenoids may move it from either the forward or backward high voltage position to the corresponding low voltage position or vice versa. The distance between the two notches with which each of the pawls 58 and 59 coöperates is equal to the distance through which the connection solenoids may move the drum, while that between the two notches with which each of the pawls 65 and 66 coöperates is equal to that through which the direction solenoids may move it The master control switch 37, the master reversing switch 45, and the master connection switch 46 are preferably mounted in the same controller box 68, as illustrated in Figs. 12 and 13. There may be two similar master controllers on a car, the second being indicated in outline in Fig. 1 at 68ª. The master control switch 37 has eight operating positions, in addition to a transition or "bridge" position T and an off position O. The master reversing switch preferably has five positions, FS, FI, M, BI, BS, the two end ones being the operating or setting positions. The two positions adjacent to the middle position make no connections but are merely indicating positions to indicate to which position the master reversing switch was last moved. By providing these two positions, the current for the direction solenoids 54 and 55 may be cut off as soon as such solenoids have completed their work. If desired, suitable provision may be made for biasing the master reversing switch from the two setting to the two indicating positions, as in the manner shown in my Patent No. 916,898, granted March 30, 1909. The master connecting switch 46 is made in the same general manner, but with four positions, HS, HI, LI, LS; it admits current to the connection solenoids 62 and 63 only when it is in its extreme or setting positions, the two intermediate positions being for indicating purposes.

The same handle 44 is used to operate the switches 45 and 46, as well as the switch 43, this handle being normally on the shaft 45ª of the master reversing switch 45, as indicated in Fig. 13. A finger is preferably provided on this handle to engage the flange 69, which is notched at the middle position of the switch; thus the handle can be removed from or replaced on the shaft of the master reversing switch only when said switch is in such middle position. When the handle 44 is on the shaft 46ª of the switch 46 its finger coöperates with a similar flange 70, which is provided with two notches corresponding to the two indicating positions of such switch; thus the handle can be placed on and removed from the shaft 46ᵃ only when the master connection switch 46 is in one of its indicating positions. The handle 71 on the shaft 37ᵃ of the master control switch 37 may or may not be removable. If removable, it preferably has a finger which coöperates with a flange 72, notched only at the off position; this prevents the handle 71 from being placed on or removed from the shaft 37ᵃ unless the master control switch is in off position.

Suitable interlocking mechanism is provided to prevent the switch 37 from being moved out of off position unless the switches 45 and 46 are both in indicating positions, to prevent the switch 45 from being moved out of an indicating position unless the switch 37 is in off position and the switch 46 in an indicating position, and to prevent the switch 46 from being moved out of an indicating position unless the switch 37 is in off position and the switch 45 in its middle position. This interlocking mechanism comprises two disks 73 and 74 on the shaft 37ᵃ, two disks 75 and 76 on the shaft 45ᵃ, two disks 77 and 78 on the shaft 46ᵃ, and three swinging double pawls 79, 80, and 81. The pawl 79 coöperates with the disks 73 and 75, the disk 73 having a single notch which comes opposite the end of the pawl 79 when the master control switch 37 is in off position and the disk 75 having two notches which come opposite the end of the pawl 79 when the master reversing switch 45 is in its two indicating positions respectively. The pawl 80 coöperates with the disks 76 and 78, the disk 76 having a single notch which comes opposite the end of the pawl 80 when the master reversing switch 45 is in its middle position, and the disk 78 having two notches which come opposite the end of the pawl 80 when the master connection switch 46 is in its two indicating positions respectively. The pawl 81 coöperates with the disks 74 and 77, the disk 74 having a single notch which comes opposite the end of the pawl 81 when the master control switch 37 is in off position, and the disk 77 having two notches which come opposite the end of the pawl 81 when the master connection switch 46 is in its two indicating positions respectively. Each of the pawls 79, 80, and 81 must at all times be in a notch of one of the disks coöperating with it. Thus the master control switch 37 cannot be turned unless the pawls 79 and 81 are in notches in the disks 75 and 77 respectively, the master reversing switch 45 unless the pawls 79 and 80 are in notches in the disks 73 and 78 respectively, and the master connection switch 46 unless the pawls 80 and 81 are in notches in the disks 76 and 74 respectively. Thus it is impossible for more than one of these three switches to be in a circuit-closing position at any time. The two disks on each shaft are shown as having different diameters; this is merely for clearness of illustration. The pawl 81 and the two disks 74 and 77 are merely extra safeguards, as the same interlocking action would take place with such parts omitted.

In the controlling circuits is a circuit-breaker 82, biased to open position. When moved to closed position it is held there by a magnet 83, which becomes deënergized upon failure of voltage for any reason and allows the circuit-breaker to open. When open, the circuit-breaker is held in open position by a latch 84, which is not released until the magnet 83 is again energized; when the circuit-breaker may be closed by hand. The magnet 83 is in series with the operating solenoid of the main circuit-breaker 85, an overload switch 86, and the switch 87 and its operating solenoid. In shunt to the switch 87 is the solenoid 88 of the double-throw switch 89. The solenoid of the switch 87 is so wound that when the trolley 24 is on a low voltage section of the line the switch 87 remains in its lower or closed position, thus short-circuiting the solenoid 88, and when the trolley 24 passes to a high voltage section the switch 87 is opened by its operating solenoid, thus throwing current through the solenoid 88 to raise the switch 89 from its lower to its upper position.

Between the high and low voltage sections of the line there is an insulated section 90, disconnected from both the high and low voltage sections. When the car is passing from either the high or the low voltage section to the other, it passes over this section 90, thus causing the deënergization of the coil 83 and the operating coil of the circuit-breaker 85. This causes the circuit-breakers 82 and 85 to open, thus disconnecting all circuits save that including the coil 83. If any of the various controlling switches are closed at this time, their operating solenoids are immediately deënergized and they are allowed to open, thus breaking all motor circuits. The insulated section 90 is paralleled by a short section 91, which is preferably connected to the low voltage section 23. The section 91 is for the purpose of allowing the energization of the various circuits on the car in case the car should stop with the trolley on the section 90.

In explaining the operation of the system, it will be assumed for simplicity that there is but a single car. If several cars are coupled together to form a train, the operation of the apparatus would be the same on all the cars, suitable connections between the cars being made by the train wires $a, b, c, \ldots o$.

Figure 2:
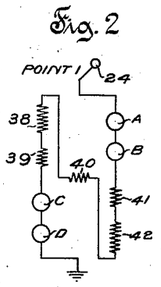
Figure 3:
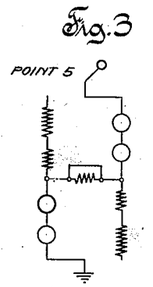

Assume that the car has been operating on the low voltage section 23. In order for it so to operate the switch 89 is down, and the switches 43 and 25 are in low voltage position. If the car is going forward, the switch 25 is in its forward low voltage position. When the trolley leaves the section 23 and engages the section 90, the various circuits are deënergized in the manner already described. When the trolley reaches the high voltage section 22, the circuit including the magnet 83 is energized, thus releasing the latch 84, closing the circuit-breaker 85, lifting the switch 87, and throwing current through the solenoid 88 to cause it to raise the switch 89. The lifting of the latch 84 permits the manual closing of the circuit-breaker 82. The closing of this circuit-breaker and the lifting of the switch 89 supplies the potential of the section 22 to the contact 92 on the switch 43. The motorman now turns his master reversing switch 45 to its middle position M, transfers its handle 44 to the switch 43, and moves the latter from low voltage to high voltage position. This puts the parts of the resistance sections 38, 39, 41, and 42 in series, whereas before they were in parallel. It also connects the contacts 92 and 93, thus energizing the wire 94. This wire leads to the contact 95 on the switch 25; but since this switch is in low voltage position, with the contact 95 out of engagement with any of the contact segments on the drum of said switch, the circuit stops there. The wire 94 also leads, through a resistance 96, to a contact 97 on the master connection switch 46. The handle 44 is now transferred to this switch to move it to high voltage setting position HS, and the connection is completed from the contact 97 through the train wire $b$ to the solenoid 63. The solenoid 63, being thus energized, moves the drum 25 from the forward low voltage position to the forward high voltage position, the latter being the one indicated in Figs. 14 to 17 inclusive. The movement of the switch 25 to the high voltage position completes the circuit from the contact 95 to the wire 98, which is suitably connected to the motor 50 of the air compressor, the headlight 52, the lamp circuits 47 and 48, and the control circuit supply wire 99. The switch 43 being in high voltage position, the lamp circuits 47 and 48 are in series, and the resistances 49, 51, and 53 are in their associated circuits. The positions of the switches 43 and 25 must thus correspond in order that these various circuits may be supplied. The switch 46 being now returned to the high voltage indicating position, the handle 44 may be removed and placed on the reversing switch 45. The latter is then moved to forward indicating position, assuming that the car is to continue in its forward direction of movement. If moved beyond such position to forward setting position no harm is done, for with the bar 56 in the position shown in Fig. 15, the energization of the solenoid 54 produces no results; such movement merely insures the setting of the switch 25 in a forward position and prevents the operation of the master control switch 37 until the master reverser is brought back to indicating position. The car may now be started. When the master control switch 37 is moved to the first position, the operating solenoids for the switches 26, 28, 31, and 35 are energized to raise these switches, obtaining the motor connections shown diagrammatically in Fig. 2. This circuit extends from the trolley 24 through the switch 85, the overload coil 100, the switch 26, a blade of the cut-out switch 101, the motors A and B in series through suitable connections on the switch 25, another blade of the cut-out switch 101, the two parts of the resistance section 41 in series, the proper connections on the auxiliary switch 43, the two parts of the resistance section 42 in series, the switch 35, the resistance section 40, the switch 31, the switch 28, the two parts of the resistance section 38 in series, the proper connections on the switch 43, the two parts of the resistance section 39 in series, the lowest blade of the cut-out switch 102, and the motors C and D in series through the proper connections on the drum 25, to ground. The motors may now start. When the master control switch is moved to the second position, the operating solenoid of the switch 33 is energized in addition to those already energized, thus causing the closing of said switch to short-circuit the resistance sections 41 and 42. By the time the master controller has fully reached position 2, the solenoid of the switch 35 may be deënergized, allowing said switch to open. In the third position of the master switch 37, switch 29 is also raised, thus short-circuiting the resistance section 38. The switch 28 may be allowed to open as soon as the switch 29 has been closed. In the fourth position of the master switch, the switch 30 is caused to be closed; this short-circuits the resistance section 39. The switch 29 may be allowed to open as soon as the switch 30 is closed. When the master switch 37 is moved to position 5, the switch 32 is closed, thus short-circuiting the resistance section 40. This puts the two groups of motors, A and B, and C and D, in series across the line with no resistance in circuit. This position, shown diagrammatically in Fig. 3, is suitable for slow running.

Figure 4:
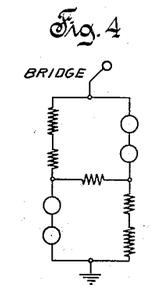
Figure 5:
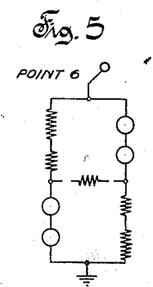
Figure 6:
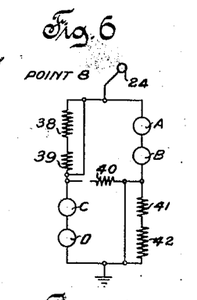
Figure 7:
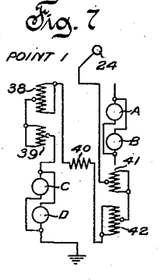
Figure 8:
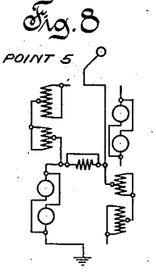
Figure 9:
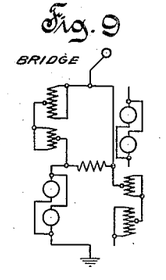
Figure 10:
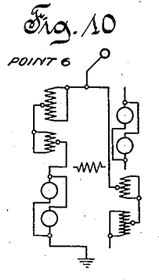
Figure 11:
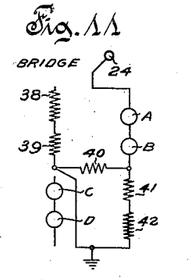
Fig. 11 showing the connections in the "bridge" position with the other group of motors cut out and the car on a high voltage section of the line.

When the master switch is moved from position 5 to position 6, it passes through a transition or bridge position T, in which the switch 32 is allowed to open, and the switches 27 and 36 are closed. This makes the connections shown in Fig. 4, putting the resistance sections 41 and 42 in series with and on the ground side of the motors A and B and the resistance sections 38 and 39 in series with and on the trolley side of the motors C and D; it also puts the bridge resistance 40 in the connection between the intermediate points between each set of motors and its associated resistances. As the master switch is moved on immediately from the transition position T to position 6, the switches 30, 31, and 33 are allowed to open, thus breaking the bridge wire connection and leaving the two sets of motors connected in parallel, as shown in Fig. 5. By means of this bridge control scheme, the changing of the motors from series to parallel is effected without breaking the circuits of any of the motors. The presence of the resistance section 40 in the bridge wire at the time the latter is broken prevents any serious sparking as a result of such breaking. When the master switch 37 is moved to position 7, the switches 28, 29, 34, and 35 are closed, thus short-circuiting the resistance sections 38 and 42. When the master switch 37 is moved to the eighth or final position, the switches 30 and 33 are caused to be closed, thus cutting out the resistance sections 39 and 41 and connecting the groups of motors in parallel directly across the line, as shown in Fig. 6. The switches 29 and 34 may be allowed to open immediately after the switches 30 and 33 have closed. In order to stop the car, the master control switch 37 is moved back to off position, changes in the connections taking place in an order substantially the reverse of that above described.

In case of an overload at any time, the overload coil 100 lifts its core and closes the switch 86. This short-circuits the operating solenoid of the circuit-breaker 85, causing the opening of such circuit-breaker. This interrupts all motor circuits. Any arcing occurs at the circuit-breaker 85; this arcing may be suppressed in any suitable manner. The overload switch 86 is held in its closed position by the holding coil 103, which remains energized until the master control switch 37 is moved back to its off position. When this master switch is moved back to off position the holding coil 103 is deënergized and the switch 86 allowed to drop, thus again throwing current through the operating solenoid of the circuit-breaker 85.

When the car passes to a low voltage section 23, the switches 87 and 89 drop to their lower positions, thus connecting the contact 104 to the trolley. To complete the circuit further, the switch 43 must be turned to low voltage position, thus putting the parts of each of the resistance sections 38, 39, 41, and 42, and also the two lamp circuits 47 and 48, in parallel instead of in series, and short-circuiting the resistances 49, 51, and 53. The movement of the switch 43 to low voltage position renders it possible for the solenoid 62 to be energized by the movement of the master connection switch 46 to low voltage position, the circuits for the connection magnets 62 and 63 being the only parts of the control circuits which are independent of the position of the switch 25. When the solenoid 62 has moved the switch 25 to a low voltage position, the connection for the remaining controlling circuits is completed through the proper contact on the switch 25 and the contacts 105 and 106, thus energizing the wires 98 and 99. The control may now be effected in the same manner as that already described, the only difference being that the two parts of each of the resistance sections 38, 39, 41, and 32, and the two motors of each group of motors are now in parallel instead of in series. The differences in the connections for the high and low voltage arrangements for various points of the master switch are clear from a comparison of Figs. 7, 8, 9, and 10 with Figs. 2, 3, 4, and 5.

Figure 18:
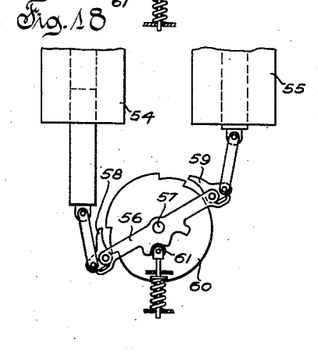
Figs. 18, 19, and 20 are views corresponding to Figs. 15, 16, and 17, but with the switch in the backward high voltage position.
Figure 19:
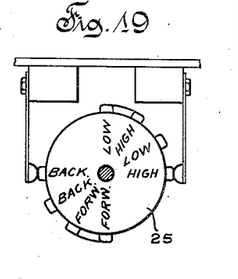
Figure 20:
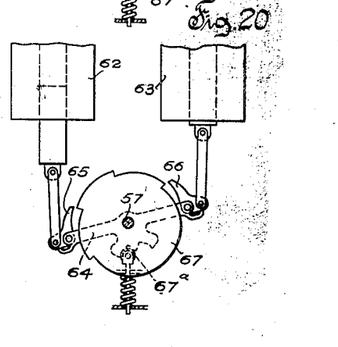

For backward movement of the car, the solenoid 55 is energized, by the proper movement of the master reversing switch 45, to move the combined series-parallel and reversing drum 25 from a forward position, such as shown in Figs. 14 to 17 inclusive, to a backward position, such as shown in Figs. 18 to 20 inclusive. As illustrated, both of these positions are high voltage positions; but if the drum is already in a low voltage position, the energization of the solenoid 55 will move it to the other low voltage position.

It sometimes happens that one or more of the motors become disabled. It is then desirable that the remaining motors, or some of them, be operable to bring the car to the car barn. In the arrangement shown this can be done by means of the cut-out switches 101 and 102. By throwing the switch 101 from its upper or full line position to the lower or dotted line position, the motors A and B are cut out, the remaining motors and all the resistance sections being left in circuit. The system may then be operated to control the motors C and D, the connections for certain of the points of the master controller being shown in Figs. 7 to 10 inclusive. The switch 101 has two additional blades, the upper one of which controls the circuit of the operating solenoid of the switch 36; so that by the movement of this cut-out switch 101 to its lower position it becomes impossible for such operating solenoid to be energized. This makes it impossible for the resistance sections 41 and 42 to be connected to the ground for the parallel positions of the master switch, as they would be if this blade were not provided. This is indicated by a comparison of Figs. 9 and 10 with Figs. 4 and 5. The cut-out switch 102 controls the other group of motors C and D, and when moved to the lower or dotted line position disconnects the trolley side of such motors and connects the ground side of the resistance section 39 directly to the ground. The switch 102 also has two additional blades, the upper one of which controls the operating solenoid of the switch 27. Thus when the cut-out switch 102 is open, thus cutting out the motors C and D, it becomes impossible to cause the closing of the switch 27. Thus the resistance sections 38 and 39 cannot be connected to the trolley for the parallel positions of the master switch, as they would if this blade were not provided. The two remaining blades on the two cut-out switches respectively are in parallel with each other in the wire 99, or the main supply wire for the control circuits. Thus when both cut-out switches are open, it is impossible to supply operating current to any of the control circuits except to the solenoids 62 and 63. By the provision of these extra blades on the two cut-out switches, it becomes impossible to obtain a short-circuit from trolley to ground, or a useless waste of current even less than a short-circuit, when either or both of the groups of motors are cut out.

The system of control above described is capable of wide modification without departing from the spirit and scope of my invention. All such modifications I aim to cover in the following claims.

What I claim as new is:

1. In combination, a variable resistance having sections which are divided into a plurality of parts, and means for putting the parts of said sections in series and in parallel.

2. In combination, a resistance having sections divided into a plurality of parts, means for putting the parts of said sections in series and in parallel, and means for cutting sections of said resistance into and out of circuit.

3. In combination, a motor, a resistance for the circuit thereof, said resistance having sections divided into parts, a switch for putting the parts of said sections in series and in parallel, and means for cutting sections of said resistance into and out of circuit.

4. In combination, a plurality of motors, a resistance for the circuit of said motors, said resistance having sections divided into parts, means for putting the motors in series and parallel relation, means for putting the parts of said resistance sections in series and parallel relation, and means for cutting said resistance sections into and out of circuit with the motors.

5. In combination, a plurality of motors, a resistance for the circuit of said motors, said resistance having sections divided into parts, means for putting the motors in series and parallel relation, means for putting the parts of said resistance sections in series and parallel relation, means for cutting said resistance sections into and out of circuit with the motors, and means for preventing the motor circuit from being completed unless the motors and the parts of the resistance sections are in the same relation.

6. In combination, a plurality of motors, a resistance for the circuit of said motors, said resistance having sections divided into parts, two sources of supply of different voltages, means for putting the motors in series and parallel relation, means for putting the parts of the resistance sections in series and parallel relation, and means requiring both the motors and the parts of the resistance sections to be in parallel in order for the motors to be connected to the source of lower voltage and in series in order for the motors to be connected to the source of higher voltage.

7. In combination, a plurality of motors, a resistance for the circuit of said motors, said resistance having sections divided into parts, two sources of supply of different voltages, means for putting the motors in series and parallel relation, means for putting the parts of the resistance sections in series and parallel relation, and means requiring both the motors and the parts of the resistance sections to be in series in order for the motors to be connected to the source of higher voltage.

8. In combination, a plurality of motors, means for connecting the motors in series and in parallel, two sources of supply of different voltages, and means requiring the motors to be connected in series when the motors are connected to the source of higher voltage.

9. In combination, a plurality of motors, means for connecting the motors in series and in parallel, two sources of supply of different voltages, and means requiring the motors to be connected in series when the motors are connected to the source of higher voltage and in parallel when they are connected to the source of lower voltage.

10. In combination, a plurality of motors, means for connecting the motors in series and in parallel, two sources of supply of different voltages, means requiring the motors to be connected in series when the motors are connected to the source of higher voltage, and means for controlling the speed of the motors.

11. In combination, a plurality of motors, means for connecting the motors in series and in parallel, two sources of supply of different voltages, means requiring the motors to be connected in series when the motors are connected to the source of higher voltage and in parallel when they are connected to the source of lower voltage, and means for controlling the speed of the motors.

12. In combination, a plurality of groups of motors, means for connecting the motors of each group in series and parallel relation, two sources of current supply of different voltages, and means requiring the motors of a group to be connected in series when they are supplied from the source of higher voltage.

13. In combination, a plurality of groups of motors, means for connecting the motors of each group in series and parallel relation, two sources of current supply of different voltages, and means requiring the motors of a group to be connected in series when they are supplied from the source of higher voltage and in parallel when they are supplied from the source of lower voltage.

14. In combination, a plurality of groups of motors, means for connecting the motors of each group in series and parallel relation, two sources of current supply of different voltages, means requiring the motors of a group to be connected in series when they are supplied from the source of higher voltage, and means for connecting the groups of motors in series and parallel relation.

15. In combination, a plurality of groups of motors, means for connecting the motors of each group in series and parallel relation, two sources of current supply of different voltages, means requiring the motors of a group to be connected in series when they are supplied from the source of higher voltage and in parallel when they are supplied from the source of lower voltage, and means for connecting the groups of motors in series and parallel relation.

16. In combination, a plurality of groups of motors, means for connecting the motors of a group in series and parallel relation, a plurality of resistance sections for the circuit of said motors, said resistance sections each having a plurality of parts, and means for connecting the parts of each resistance section in series and parallel relation.

17. In combination, a plurality of groups of motors, means for connecting the motors of a group in series and parallel relation, a plurality of resistance sections for the circuit of said motors, said resistance sections each having a plurality of parts, means for connecting the parts of each resistance section in series and parallel relation, and means for cutting said resistance sections into and out of circuit with the motors.

18. In combination, a plurality of groups of motors, means for connecting the motors of a group in series and parallel relation, a plurality of resistance sections for the circuit of said motors, said resistance sections each having a plurality of parts, means for connecting the parts of each resistance section in series and parallel relation, and means for requiring the parts of the resistance sections and the motors of the groups to be in the same relation in order for the motor circuit to be completed.

19. In combination, a plurality of groups of motors, means for connecting the motors of a group in series and parallel relation, a plurality of resistance sections for the circuit of said motors, said resistance sections each having a plurality of parts, means for connecting the parts of each resistance section in series and parallel relation, means for cutting said resistance sections into and out of circuit with the motors, and means for requiring the parts of the resistance section and the motors of the groups to be in the same relation in order for the motor circuit to be completed.

20. In combination, a plurality of groups of motors, means for connecting the motors of a group in series and parallel relation, a plurality of resistance sections for the circuit of said motors, said resistance sections each having a plurality of parts, means for connecting the parts of each resistance section in series and parallel relation, two sources of current supply of different voltages, and means for requiring the motors in the groups and the parts of the resistance sections to be in series relation when the motors are supplied from the source of higher voltage.

21. In combination, a plurality of groups of motors, means for connecting the motors of a group in series and parallel relation, a plurality of resistance sections for the circuit of said motors, said resistance sections each having a plurality of parts, means for connecting the parts of each resistance section in series and parallel relation, two sources of current supply of different voltages, and means for requiring the motors in the groups and the parts of the resistance sections to be in series relation when the motors are supplied from the source of higher voltage and in parallel relation when they are supplied from the source of lower voltage.

22. In combination, a plurality of groups of motors, means for connecting the motors of a group in series and parallel relation, a plurality of resistance sections for the circuit of said motors, said resistance sections each having a plurality of parts, means for connecting the parts of each resistance section in series and parallel relation, means for cutting said resistance sections into and out of circuit with the motors, two sources of current supply of different voltages, and means for requiring the motors in the groups and the parts of the resistance sections to be in series relation when the motors are supplied from the source of higher voltage.

23. In combination, a plurality of groups of motors, means for connecting the motors of a group in series and parallel relation, a plurality of resistance sections for the circuit of said motors, said resistance sections each having a plurality of parts, means for connecting the parts of each resistance section in series and parallel relation, means for cutting said resistance sections into and out of circuit with the motors, two sources of current supply of different voltages, and means for requiring the motors in the groups and the parts of the resistance sections to be in series relation when the motors are supplied from the source of higher voltage and in parallel relation when they are supplied from the source of lower voltage.

24. In combination, a plurality of groups of motors, means for connecting the motors of a group in series and parallel relation, a plurality of resistance sections for the circuit of said motors, said resistance sections each having a plurality of parts, means for connecting the parts of each resistance section in series and parallel relation, and means for connecting the groups of motors in series and parallel relation.

25. In combination, a plurality of groups of motors, means for connecting the motors of a group in series and parallel relation, a plurality of resistance sections for the circuit of said motors, said resistance sections each having a plurality of parts, means for connecting the parts of each resistance section in series and parallel relation, means for cutting said resistance sections into and out of circuit with the motors, and means for connecting the groups of motors in series and parallel relation.

26. In combination, a plurality of groups of motors, means for connecting the motors of a group in series and parallel relation, a plurality of resistance sections for the circuit of said motors, said resistance sections each having a plurality of parts, means for connecting the parts of each resistance section in series and parallel relation, means for requiring the parts of the resistance sections and the motors of the groups to be in the same relation in order for the motor circuit to be completed, and means for connecting the groups of motors in series and parallel relation.

27. In combination, a plurality of groups of motors, means for connecting the motors of a group in series and parallel relation, a plurality of resistance sections for the circuit of said motors, said resistance sections each having a plurality of parts, means for connecting the parts of each resistance section in series and parallel relation, means for cutting said resistance sections into and out of circuit with the motors, means for requiring the parts of the resistance section and the motors of the groups to be in the same relation in order for the motor circuit to be completed, and means for connecting the groups of motors in series and parallel relation.

28. In combination, a plurality of groups of motors, means for connecting the motors of a group in series and parallel relation, a plurality of resistance sections for the circuit of said motors, said resistance sections each having a plurality of parts, means for connecting the parts of each resistance section in series and parallel relation, two sources of current supply of different voltages, means for requiring the motors in the groups and the parts of the resistance sections to be in series relation when the motors are supplied from the source of higher voltage, and means for connecting the groups of motors in series and parallel relation.

29. In combination, a plurality of groups of motors, means for connecting the motors of a group in series and parallel relation, a plurality of resistance sections for the circuit of said motors, said resistance sections each having a plurality of parts, means for connecting the parts of each resistance section in series and parallel relation, two sources of current supply of different voltages, means for requiring the motors in the groups and the parts of the resistance sections to be in series relation when the motors are supplied from the source of higher voltage and in parallel relation when they are supplied from the source of lower voltage, and means for connecting the groups of motors in series and parallel relation.

30. In combination, a plurality of groups of motors, means for connecting the motors of a group in series and parallel relation, a plurality of resistance sections for the circuit of said motors, said resistance sections each having a plurality of parts, means for connecting the parts of each resistance section in series and parallel relation, means for cutting said resistance sections into and out of circuit with the motors, two sources of current supply of different voltages, means for requiring the motors in the groups and the parts of the resistance sections to be in series relation when the motors are supplied from the source of higher voltage, and means for connecting the groups of motors in series and parallel relation.

31. In combination, a plurality of groups of motors, means for connecting the motors of a group in series and parallel relation, a plurality of resistance sections for the circuit of said motors, said resistance sections each having a plurality of parts, means for connecting the parts of each resistance section in series and parallel relation, means for cutting said resistance sections into and out of circuit with the motors, two sources of current supply of different voltages, means for requiring the motors in the groups and the parts of the resistance sections to be in series relation when the motors are supplied from the source of higher voltage and in parallel relation when they are supplied from the source of lower voltage, and means for connecting the groups of motors in series and parallel relation.

32. In an electric railway system, a line having sections of high and low voltage, a car, a plurality of driving motors for the car, and means for putting said motors in parallel when the car is connected to a low voltage section of the trolley line and in series when it is connected to a high voltage section of the trolley line.

33. In an electric railway system, a line having sections of high and low voltage, a car, a plurality of driving motors for the car, means for putting said motors in parallel when the car is connected to a low voltage section of the trolley line and in series when it is connected to a high voltage section of the trolley line, and means for preventing the completion of the motor circuit unless said motors are so connected.

34. In an electric railway system, a line having sections of high and low voltage, a car, a plurality of driving motors for the car, means for putting said motors in parallel when the car is connected to a low voltage section of the trolley line and in series when it is connected to a high voltage section of the trolley line, a controlling sectional resistance for the motor, sections of said resistance each comprising two parts, and means for connecting the parts of each of said two-part resistance sections in series and parallel.

35. In an electric railway system, a line having sections of high and low voltage, a car, a plurality of driving motors for the car, means for putting said motors in parallel when the car is connected to a low voltage section of the trolley line and in series when it is connected to a high voltage section of the trolley line, a controlling sectional resistance for the motor, sections of said resistance each comprising two parts, means for connecting the parts of each of said two-part resistance sections in series and parallel, and means for preventing the completion of the motor circuit unless said motors and the parts of said resistance sections are similarly connected.

36. In an electric railway system, a line having high and low voltage sections, a car, a plurality of groups of driving motors for said car, means for connecting the motors of each group in series and in parallel, a controlling sectional resistance, sections of said resistance comprising a plurality of parts, means for connecting the parts of the several resistance sections in series and in parallel, and remotely controlled means for putting said groups of motors in series and in parallel and for cutting said resistance sections into and out of circuit.

37. In an electric railway system, a line having high and low voltage sections, a car, a plurality of groups of driving motors for said car, means for connecting the motors of each group in series and in parallel, a controlling sectional resistance, sections of said resistance comprising a plurality of parts, means for connecting the parts of the several resistance sections in series and in parallel, remotely controlled means for putting said groups of motors in series and in parallel and for cutting said resistance sections into and out of circuit, and means for preventing the motor circuits from being completed when the car is on a high voltage section unless both the motors of the groups and the parts of the resistance sections are in series.

38. In an electric railway system, a line having high and low voltage sections, a car, a plurality of groups of driving motors for said car, means for connecting the motors of each group in series and in parallel, a controlling sectional resistance, sections of said resistance comprising a plurality of parts, means for connecting the parts of the several resistance sections in series and in parallel, remotely controlled means for putting said groups of motors in series and in parallel and for cutting said resistance sections into and out of circuit, and means for preventing the motor circuits from being completed when the car is on a high voltage section unless both the motors of the groups and the parts of the resistance sections are in series and for preventing the motor circuits from being completed when the car is on a low voltage section unless both the motors of the groups and the parts of the resistance sections are in parallel.

39. In an electric railway system, a car, a plurality of groups of driving motors for said car, means for connecting the motors of each group in series and in parallel, a controlling sectional resistance, sections of said resistance comprising a plurality of parts, means for connecting the parts of the several resistance sections in series and in parallel, and remotely controlled means for putting said groups of motors in series and in parallel and for cutting said resistance sections into and out of circuit.

40. In an electric railway system, a car, a plurality of groups of driving motors for said car, means for connecting the motors of each group in series and in parallel, a controlling sectional resistance, sections of said resistance comprising a plurality of parts, means for connecting the parts of the several resistance sections in series and in parallel, remotely controlled means for putting said groups of motors in series and in parallel and for cutting said resistance sections into and out of circuit, and means for preventing the completion of the motor circuit unless the connections of the parts of the resistance sections and of the motors of the groups correspond.

41. In an electric railway system, a line having high and low voltage sections, a car, a driving motor or motors for the car, electrically operated switching apparatus for controlling said motors, a resistance in the operating circuit of said switching apparatus, and means for cutting out said resistance when the car is on a low voltage section.

42. In an electric railway system, a line having high and low voltage sections, a car, a driving motor or motors for the car, electrically operated switching apparatus for controlling said motors, a resistance in the operating circuit of said switching apparatus, means for cutting out said resistance when the car is on a low voltage section, and means for preventing the completion of the operating circuit of said switching apparatus when the car is on a high voltage section unless said resistance is cut in.

43. In an electric railway system, a line having high and low voltage sections, a car, a driving motor or motors for the car, electrically operated switching apparatus for controlling said motors, a resistance in the operating circuit of said switching apparatus, means for cutting out said resistance when the car is on a low voltage section, and means for preventing the completion of the operating circuit of said switching apparatus when the car is on a high voltage section unless said resistance is cut in and for preventing the completion of said circuit when the car is on a low voltage circuit unless said resistance is short-circuited.

44. In combination, a plurality of motors, and a combined series-parallel and reversing switch therefor, said switch having four positions, the two most remote of which produce both different directions of motion and different inter-connections of the motors.

45. In combination, a plurality of motors, and a combined series-parallel and reversing switch therefor, said switch having four positions, the two intermediate positions of which produce both different directions of motion and different inter-connections of the motors.

46. In combination, a plurality of motors, and a combined series-parallel and reversing switch therefor, said switch having four positions, there being equal distances between positions which produce the same interconnections of the motor.

47. In combination, a plurality of motors, and a combined series-parallel and reversing switch therefor, said switch having four positions, there being equal distances between positions which produce the same interconnections of the motor and different equal distances between positions which produce the same direction of movement of the motors.

48. In combination, a plurality of motors, a combined series-parallel and reversing switch therefor, said switch having four positions, there being equal distances between positions which produce the same interconnections of the motor and different equal distances between positions which produce the same direction of movement of the motors, and power-operated means which when energized moves said switch a distance equal to that between two positions producing the same direction of movement.

49. In combination, a plurality of motors, a combined series-parallel and reversing switch therefor, said switch having four positions, there being equal distances between positions which produce the same interconnections of the motor and different equal distances between positions which produce the same direction of movement of the motors, and power-operated means which when energized moves said switch a distance equal to that between two positions producing the same interconnections of the motors.

50. In combination, a plurality of motors, a combined series-parallel and reversing switch therefor, said switch having four positions, there being equal distances between positions which produce the same interconnections of the motor and different equal distances between positions which produce the same direction of movement of the motors, power-operated means which when energized moves said switch a distance equal to that between two positions producing the same direction of movement, and power-operated means which when energized moves said switch a distance equal to that between two positions producing the same interconnections of the motors.

51. In combination, a plurality of motors, a combined series-parallel and reversing switch therefor, said switch having four positions, there being equal distances between positions which produce the same interconnections of the motor and different equal distances between positions which produce the same direction of movement of the motors, and a pair of magnets which when energized respectively move said switch in opposite directions a distance equal to that between two positions producing the same direction of movement of the motors.

52. In combination, a plurality of motors, a combined series-parallel and reversing switch therefor, said switch having four positions, there being equal distances between positions which produce the same interconnections of the motor and different equal distances between positions which produce the same direction of movement of the motors, and a pair of magnets which when energized respectively move said switch in opposite directions a distance equal to that between two positions producing the same interconnections of the motors.

53. In combination, a plurality of motors, a combined series-parallel and reversing switch therefor, said switch having four positions, there being equal distances between positions which produce the same interconnections of the motor and different equal distances between positions which produce the same direction of movement of the motors, a pair of magnets which when energized respectively move said switch in opposite directions a distance equal to that between two positions producing the same direction of movement of the motors, and an additional pair of magnets which when energized respectively move said switch in opposite directions a distance equal to that between two positions producing the same interconnections of the motors.

54. In combination, a plurality of motors, a combined series-parallel and reversing switch therefor, power-operated means for moving said switch between two positions which produce the same direction of movement of the motors, other power-operated means for moving the switch between two positions which produce the same interconnections of the motors, means for admitting power to each of said power-operated means, and interlocking mechanism for preventing movement of either of said power-admitting means to power-admitting position unless the other is not in power-admitting position.

55. In combination, a plurality of motors, a combined series-parallel and reversing switch therefor, power-operated means for moving said switch between two positions which produce the same direction of movement of the motors. other power-operated means for moving the switch between two positions which produce the same interconnections of the motors, means for admitting power to each of said power-operated means, power-operated means for otherwise controlling the motors, means for admitting power for the operation of said last-named power-operated means, and interlocking mechanism for preventing the movement of any of said power-admitting means to power-admitting position unless the other two are not in power-admitting position.

56. In combination, a plurality of motors, a combined series-parallel and reversing switch therefor, power-operated means for moving said switch between two positions which produce the same direction of movement of the motors, other power-operated means for moving the switch between two positions which produce the same interconnections of the motors, means for admitting power to each of said power-operated means, power-operated means for otherwise controlling the motors, means for admitting power for the operation of said last-named power-operated means, and interlocking mechanism for preventing the movement of said last-named power-admitting means to power-admitting position unless the other two power-admitting means are not in power-admitting position.

57. In combination, a plurality of motors, a combined series-parallel and reversing switch therefor, power-operated means for moving said switch between two positions which produce the same direction of movement of the motors, other power-operated means for moving the switch between two positions which produce the same interconnections of the motors, means for admitting power to each of said power-operated means, power-operated means for otherwise controlling the motors, means for admitting power for the operation of said last-named power-operated means, and interlocking mechanism for preventing the movement of either of said first two power-admitting means to power-admitting position unless the third is not in power-admitting position.

58. In combination, a plurality of motors, a combined series-parallel and reversing switch therefor, power-operated means for moving said switch between two positions which produce the same direction of movement of the motors, other power-operated means for moving the switch between two positions which produce the same interconnections of the motors, means for admitting power to each of said power-operated means, power-operated means for otherwise controlling the motors, means for admitting power for the operation of said last-named power-operated means, and interlocking mechanism for preventing the movement of said last-named power-admitting means to power-admitting position unless one of the other two power-admitting means is not in power-admitting position.

59. In combination, a plurality of motors, a combined series-parallel and reversing switch therefor, power-operated means for moving said switch between two positions which produce the same direction of movement of the motors, other power-operated means for moving the switch between two positions which produce the same interconnections of the motors, means for admitting power to each of said power-operated means, power-operated means for otherwise controlling the motors, means for admitting power for the operation of said last-named power-operated means, and interlocking mechanism for preventing the movement of one of said first two power-admitting means to power-admitting position unless the third is not in power-admitting position.

60. In an electric railway system, a line having high and low voltage sections, a car, a plurality of driving motors therefor, a series-parallel switch for the motors, power-operated means for moving said switch to vary the interconnections of the motors, other power-operated means for otherwise controlling the motors, means for admitting power to each of said power-operated means, and means for preventing the admission of power to said first-named power-operated means to operate said series-parallel switch to series and parallel positions unless the car is on high voltage and low voltage sections respectively and for preventing the admission of power to operate the other power-operated means unless the motors are connected in series when the car is on a high voltage section of the line or in parallel when the car is on a low voltage section of the line.

61. In combination, two motors, a resistance, a plurality of power-operated switches for connecting said motors in series or in parallel and for varying the amount of resistance in circuit with the motors, a cut-out switch for each of said motors, and means operated by the opening of each cut-out switch for making it impossible to admit power to operate one of said power-operated switches.

62. In combination, two motors, a resistance, a plurality of power-operated switches for connecting said motors in series or in parallel and for varying the amount of resistance in circuit with the motors, a cut-out switch for each of said motors, means operated by the opening of each cut-out switch for making it impossible to admit power to operate one of said power-operated switches, and means operated by the opening of both of the cut-out switches for preventing the admission of power for the operation of another of said power-operated switches.

63. In combination, two motors, a resistance, a plurality of power-operated switches for connecting said motors in series or in parallel and for varying the amount of resistance in circuit with the motors, a cut-out switch for each of said motors, means operated by the opening of each cut-out switch for making it impossible to admit power to operate one of said power-operated switches, and means operated by the opening of both of said cut-out switches for rendering it impossible to supply power for the operation of any of said power-operated switches.

64. In combination, two motors, a controlling resistance therefor, a plurality of solenoid-operated switches for connecting said motors in series and in parallel and for cutting in and out different parts of said resistance, a master controller for said switches, a cut-out switch for each of said motors, and auxiliary switching apparatus associated with said cut-out switches for opening the circuit of the operating solenoid of one of said solenoid-operated switches upon the opening of each cut-out switch.

65. In combination, two motors, a controlling resistance therefor, a plurality of solenoid-operated switches for connecting said motors in series and in parallel and for cutting in and out different parts of said resistance, a master controller for said switches, a cut-out switch for each of said motors, and auxiliary switching apparatus associated with said cut-out switches for opening the circuit of the operating solenoid of one of said solenoid-operated switches upon the opening of each cut-out switch and for opening the circuit of the operating solenoid of still another of said solenoid-operated switches upon the opening of both of said cut-out switches.

66. In combination, two motors, a controlling resistance therefor, a plurality of solenoid-operated switches for connecting said motors in series and in parallel and for cutting in and out different parts of said resistance, a master controller for said switches, a cut-out switch for each of said motors, and auxiliary switching apparatus associated with said cut-out switches for opening the circuit of the operating solenoid of one of said solenoid-operated switches upon the opening of each cut-out switch and for opening the circuit of the operating solenoids of all of said solenoid-operated switches upon the opening of both of said cut-out switches.

67. In a motor control system, two motors or groups of motors, controlling mechanism for said motors or groups of motors, a cut-out switch for each motor or group of motors, and means operated by the opening of both of said cut-out switches at the same time for rendering said controlling mechanism inoperative.

68. In a motor control system, two motors or groups of motors, a variable resistance, electrically operated mechanism for varying said resistance and for connecting the motors or groups of motors in series and in parallel, a cut-out switch for each motor or group of motors, and means operated by the opening of both of said cut-out switches at the same time for making it impossible to supply current for the operation of the electrically operated mechanism.

69. In combination, a motor, a controller therefor, a switch in the motor circuit, said switch being biased to off position, a magnet for holding said switch closed, an overload switch which is moved to short-circuit said holding coil upon an abnormal current in the motor circuit, and means for holding said overload switch in its short-circuiting position until the controller has been moved to off position.

70. In a motor control system, a plurality of motors, means for controlling the interconnections of said motors, means for controlling the direction of movement of said motors, means for controlling the speed of said motors, and interlocking means for preventing the operation of any one of said controlling means unless the other two are in inoperative position.

Milwaukee, Wis., May 15, 1911.

In testimony whereof I affix my signature, in the presence of two witnesses.

EMMETT W. STULL.

Witnesses:
G. B. SCHLEY,
CHAS. L. BYRON.